United States Patent [19]
Guralnick

[11] Patent Number: 6,088,052
[45] Date of Patent: Jul. 11, 2000

[54] 3D STEREOSCOPIC VIDEO DISPLAY SYSTEM

[75] Inventor: Brian Guralnick, Dollard-des-Ormeaux, Canada

[73] Assignee: Recherches Point Lab Inc., Canada

[21] Appl. No.: 09/003,803

[22] Filed: Jan. 7, 1998

Related U.S. Application Data

[60] Provisional application No. 06/035,146, Jan. 8, 1997.

[51] Int. Cl.[7] .......................... H04N 13/00; H04N 13/04
[52] U.S. Cl. .............................................. 348/51; 348/42
[58] Field of Search ................................ 348/42, 51, 53, 348/56; 56/12; 345/9, 139; 359/462–477, 376

[56] References Cited

U.S. PATENT DOCUMENTS

| | | | |
|---|---|---|---|
| 4,424,529 | 1/1984 | Roese et al. | 348/56 |
| 4,523,226 | 6/1985 | Lipton et al. | 348/49 |
| 4,562,463 | 12/1985 | Lipton | 348/56 |
| 4,672,434 | 6/1987 | Suzuki et al. | 48/56 |
| 4,698,668 | 10/1987 | Milgram | 348/56 |
| 4,736,246 | 4/1988 | Nishikawa | 348/56 |
| 4,772,944 | 9/1988 | Yoshimura | 348/56 |
| 4,943,852 | 7/1990 | Femano et al. | 348/49 |
| 4,967,268 | 10/1990 | Lipton et al. | 348/56 |
| 4,979,033 | 12/1990 | Stephens | 348/56 |
| 5,181,133 | 1/1993 | Lipton | 348/53 |
| 5,245,319 | 9/1993 | Kilian | 345/9 |
| 5,497,189 | 3/1996 | Aritake et al. | 348/56 |
| 5,510,832 | 4/1996 | Garcia | 348/56 |
| 5,539,423 | 7/1996 | Kim et al. | 345/8 |
| 5,572,250 | 11/1996 | Lipton et al. | 348/43 |
| 5,606,363 | 2/1997 | Songer | 348/49 |
| 5,786,848 | 7/1998 | Isobe et al. | 348/51 |
| 5,808,588 | 9/1998 | Lin | 348/56 |
| 5,821,989 | 10/1998 | Lazzaro et al. | 348/56 |
| 5,870,137 | 2/1999 | Stuetter | 348/51 |

FOREIGN PATENT DOCUMENTS

| | | | |
|---|---|---|---|
| 5-68268 | 3/1993 | Japan | H04N 13/00 |
| 2173667 | 10/1986 | United Kingdom | H04N 13/04 |

*Primary Examiner*—Vu Le
*Attorney, Agent, or Firm*—Michael D. Bednarek; Shaw Pittman

[57] ABSTRACT

A video signal processor intended to be connected between a computer video output and a monitor that transforms non-interlaced video output into interlaced video output intended to be used for presentation of stereoscopic video 2D images, giving illusion of 3D presentations. The invention also comprises LCD glasses connected through infrared light beams to the video signal processor for alternatively opening one of the glasses' eye in accordance with the current image being shown onto the video monitor. The present invention also provides greater resolution by replacing the blank lines from an interlaced image by the previous adjacent image line.

14 Claims, 4 Drawing Sheets

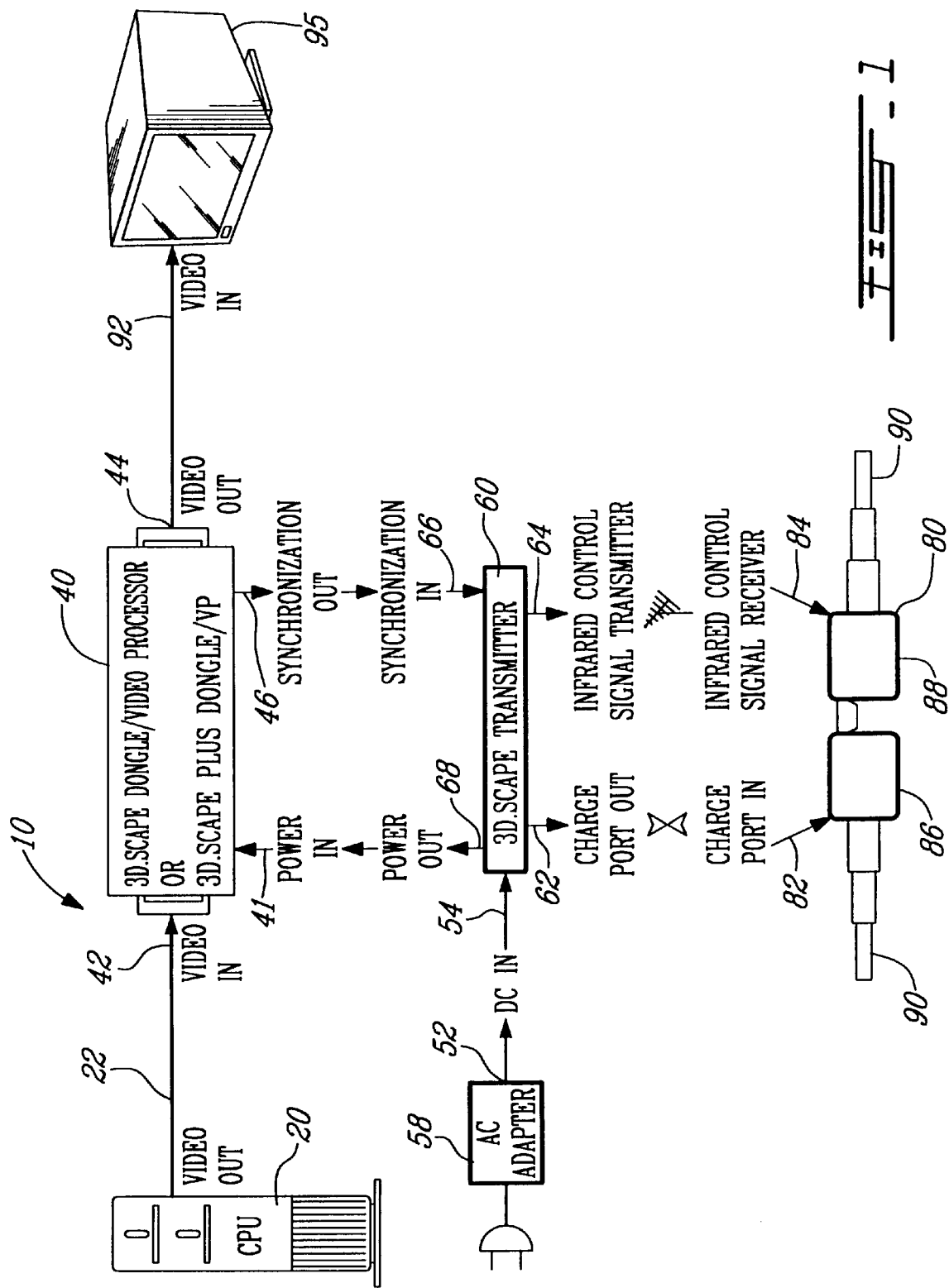

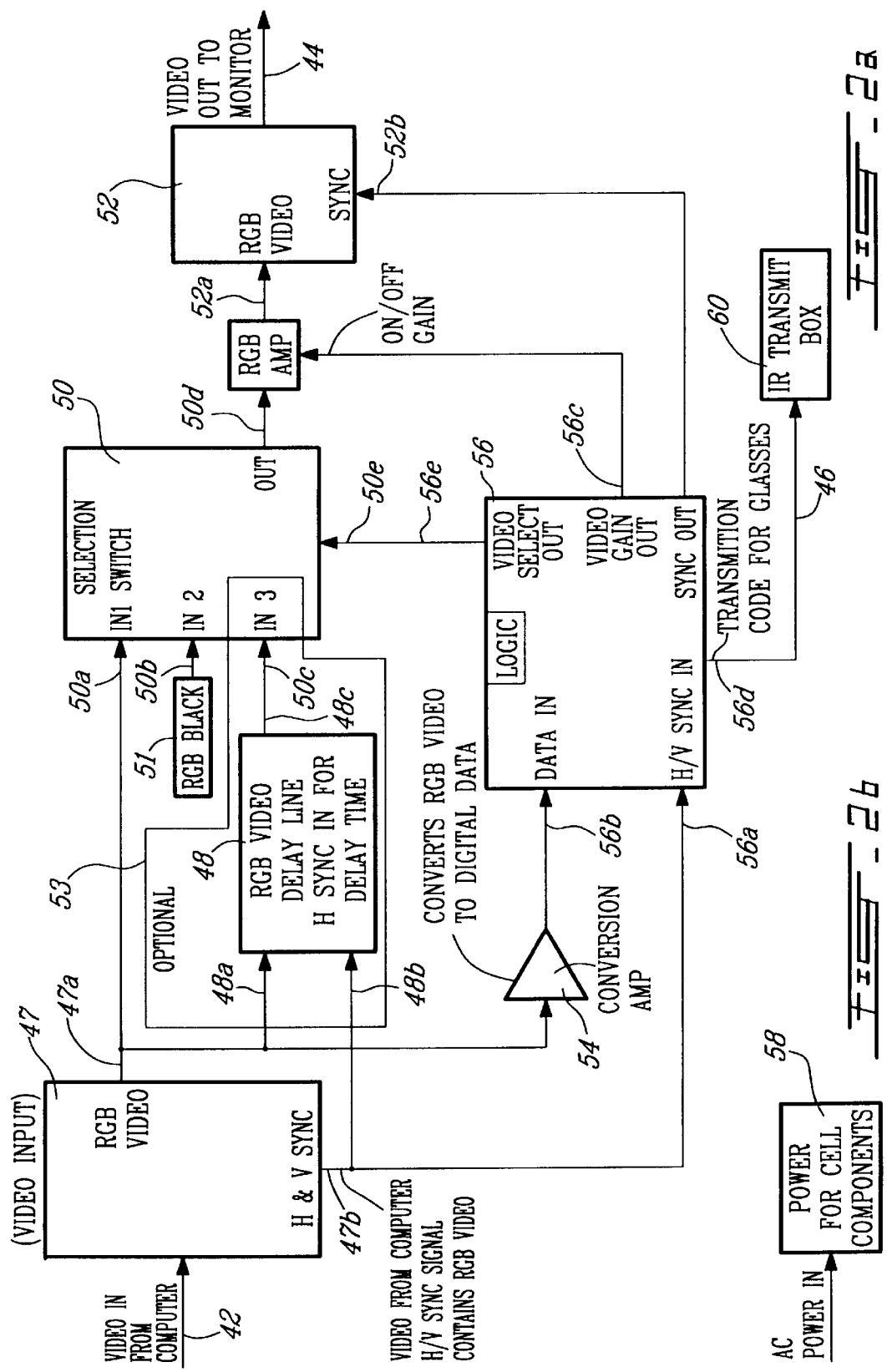

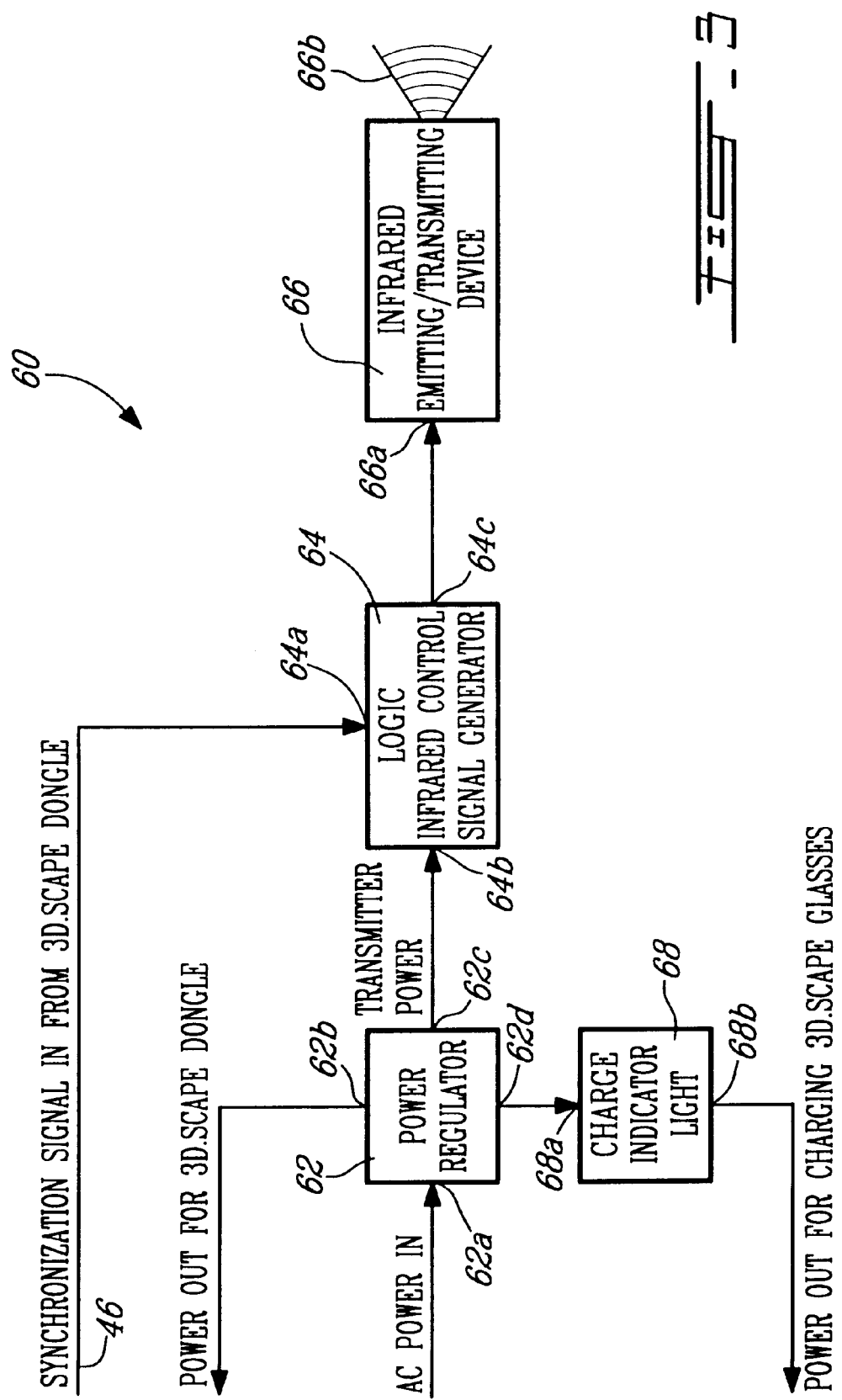

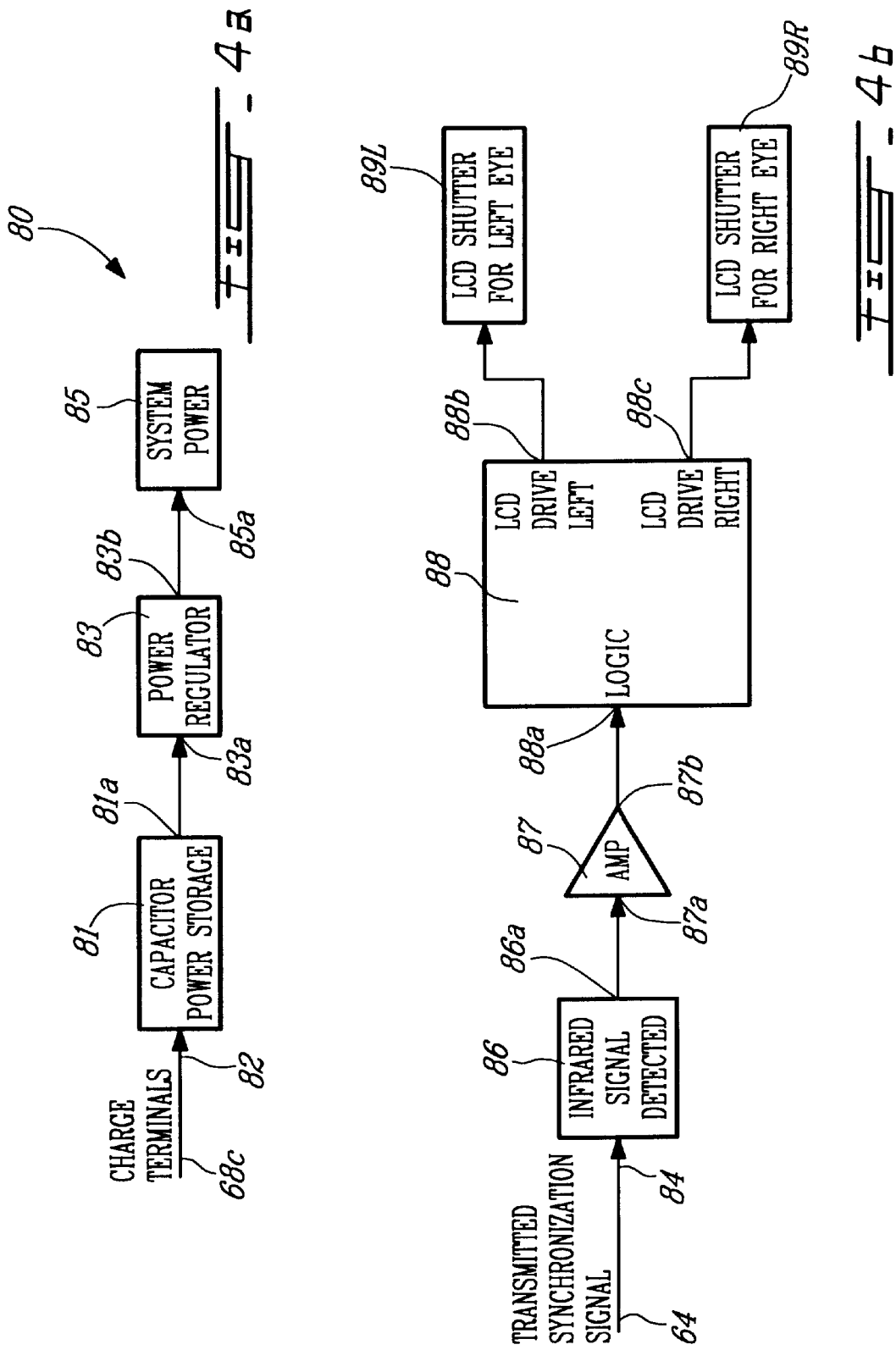

3D STEREOSCOPIC VIDEO DISPLAY SYSTEM

The present application claims priority of U.S. provisional patent application Ser. No. 06/035,146 filed on Jan. 8, 1997.

FIELD OF THE INVENTION

The present invention relates to a 3D stereoscopic video display system of the type using shutter glasses for alternately viewing 2D images on a video screen to give the illusion of 3D.

BACKGROUND OF THE INVENTION

In the prior art stereoscopic video display systems, commercially available products have been expensive, and limited in their operations mode. Additionally, switching between two dimensional and three dimensional viewing modes has often required the changing of the video monitor setup within the computer. This is very time consuming and not easily accomplished by the average user. Therefore, while these three dimensional display glasses, or virtual reality glasses have been available in the past, they have met with limited success due to many of the limitations.

A typical set up is a personal computer having software for generating both left and right eye images on a video display. LCD shutter glasses are connected either to a port of the computer or to the display's V-sync signal for synchronizing the shutter state switching with the video scanning. A number of US patents in this field have issued to Lipton et al. (assigned to StereoGraphics Corporation), such as U.S. Pat. Nos. 4,523,226, 4,967,268, 5,181,133 and 5,572,250.

There are two basic modes of providing the right and left fields or images, namely either a composite image is generated having alternate lines for the right and left images respectively, or two separate images are generated by the computer in separate parts of the memory and the computer's video card is caused to "page flip" between the right and left images with each V-sync pulse. The video card must be able to switch reliably between the two pages at the speed of the V-sync of the video display monitor. When a composite image is used, the computer generates images for the left and right perspective and then blends the two images into one in the computer memory Since each image pixel in memory will appear as a pixel on the display on a discrete line of the display, it is possible to display the right and left images separately using an interlaced video display. An interlaced video display scans twice for each image, first for the odd lines and then for the even. The glasses are then triggered to switch with each V-sync pulse.

With non-interlaced video displays, which are common and often less expensive than interlaced video displays, the technique of using a single composite image containing interleaved right eye and left eye images cannot be used according to the prior art.

For convenience, the LCD glasses control unit may be connected to a dongle on the video port of the computer without connecting the control unit to another port of the computer. However, in the prior art, a part of the image is used for controlling and synchronizing the shutter glasses with the stereroscopic images being displayed. This leaves an undesirable visual effect on the 3D environment being viewed.

SUMMARY OF THE INVENTION

Generally speaking, in accordance with the invention, a wireless pair of LCD glasses is provided to create an effect whereby the viewer perceives an image displayed on a video display terminal as being three dimensional. The glasses are able to operate with either interlaced or non-interlaced video displayed on a video display terminal. When an interlaced video display is provided, the video card of the video display terminal outputs successive frames of video as received. The successive frames of video alternate between displaying the odd lines for a first frame, and the even lines for the subsequent frame.

When a non-interlaced image is displayed on the video display terminal, each frame is displayed as a sequence of continuous horizontal lines. Therefore, during each iteration and display of a screen, each line is written by the raster. In order to process such a non-interlaced signal, the apparatus of the present invention would display alternatively the odd lines, for example, of the first frame, and the even lines of the second frame therefore, during the first frame, the even lines would be muted, and only the odd lines would be displayed, while during the second frame, the odd lines would be muted, and only the even lines would be displayed. This display technique is continued for each screen, thereby providing a simulated interlaced image.

In either apparatus, whether an interlaced or a non-interlaced image is displayed on the video display terminal, after processing, the lines displayed during each successive iteration of screens alternates between displaying the odd lines to displaying the even lines. Therefore, when viewing either type of image, the Liquid Crystal Display (LCD) glasses utilized in this invention contain LCD shutters, which allow the left and right eyes of the glasses to be opened and closed to the passage of light as instructed by an electrical signal. In the invention, the opening and closing of the left and right LCD shutters, and therefore the left and right eyes of the user, is coordinated with the alternate display of the odd and even lines of video, thereby producing a three dimensional effect. Thus, for example, the left eye will always view the even lines, with the left shutter open and the right shutter closed, and the right eye will always view the odd lines, with the right shutter open and the left shutter closed, or vice versa.

In an additional embodiment, it is possible to display each of the odd, or even lines, on the line originally assigned to it, as well as the line directly below it. Therefore, while the resolution of the image will be increased, and blank lines will not be transmitted the image will still be displayed with a three dimensional effect since only the data from either the even or odd lines will be displayed at a single time.

The current system will operate irrespective of the number of horizontal lines and at what rate a frame of video is being displayed on the video card. Therefore, the apparatus may work with any video display terminal at all, regardless of the resolution or speed thereof. This ability was not provided in any of the prior art.

The apparatus is preferably provided as a universal VGA adapter which plugs into the VGA output of a computer, and the monitor plugs into the VGA adapter. Therefore, this apparatus will work on any computer having a VGA monitor plus, including IBM compatibles, or any other computers. Additionally, while most consumer virtual reality, three dimensional glasses will produce a 320 by 240 pixel image for each eye, the system of the current invention is capable of resolutions of 2048×1536 pixels for each eye, which covers virtually all video resolutions available.

During use, the universal VGA adapter sends an infra-red signal to the LCD glasses to control the on and off of the glasses, switch between left and right eyes.

In a preferred embodiment, a menu is provided which allows the switching on and off of the three dimensional effect, without any difficult software or hardware manipulations. As noted above, in the prior art, in order to switch glasses on and off, it might be necessary to change the video mode, it may be necessary to degrade the video support under Windows '95, various other problems arise.

Therefore, it is an object of the present invention to provide a three dimensional viewing system which overcomes these drawbacks of the prior art.

Another object of the invention is to provide a three dimensional viewing system in which any resolution of video can be displayed in three dimensions.

Yet another object of the invention is to provide a three dimensional video display system which can be easily adapted for use with any computer system, and which does not require software or hardware manipulations for switching between different video modes in order to employ the system.

A still further object of the invention is to provide three dimensional video viewing system in which the depth of field seen in the image can be adjusted.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure.

According to a first broad aspect of the invention, there is provided a video signal processor for a 3D stereoscopic video display system in which left eye and right eye images are alternatingly displayed on a 2D video display for viewing with shutter glasses. The system comprises an input receiving a video image source signal, line muting means for suppressing alternate lines of a composite left eye and right eye non-interlaced video image from the video image source signal, and an output connected to the video display for supplying the video image source signal to the video display with alternating lines suppressed. In this way, a viewer wearing stereoscopic glasses synchronized with the video display sees 3D images from the video image source.

According to a second broad aspect of the invention, there is provided a shutter control circuit for a 3D stereoscopic video display system in which left eye and right eye images are alternatingly displayed on a 2D video display for viewing with shutter glasses. The circuit comprises an input receiving a video image source signal, means connected to the image source signal for deriving from an activation code image contained in a visual part of the image signal a left-right image identification signal, and means receiving the left-right image identification signal for detecting a vertical sync signal of the image source signal and for generating a correct right-left shutter signal for output to a shutter control circuit with each new vertical sync signal detected. In this way, the activation code correctly sets the shutter control circuit without affecting viewing enjoyment after appearance of the activation code.

According to a third broad aspect of the invention, there is provided a shutter control circuit for a 3D stereoscopic video display system in which left eye and right eye images are alternatingly displayed on a 2D video display for viewing with shutter glasses. The circuit comprises an input receiving a video image source signal, means connected to the image source signal for determining a right-left image identification from at least one shutter control image line contained in each image of the image source signal, means for generating a correct right-left shutter signal for output to a shutter control circuit in accordance with the determined right-left image identification for each image of the image source signal, means connected to the image source signal for suppressing the shutter control image lines, and an output connected to the video display for supplying the video image source signal with suppressed shutter control image lines to the video display. In this way, whereby the shutter control image lines do not interfere with viewing the 3D images.

BRIEF DESCRIPTION OF THE DRAWINGS

For a fuller understanding of the invention, reference is had to the following description taken in connection with the accompanying drawings, in which;

FIG. 1 is a flow diagram depicting the overall functioning of a three dimensional video display system constructed in accordance with the invention;

FIG. 2 is a flow chart diagram depicting a video processing of the system constructed in accordance with the invention;

FIG. 3 is a flow chart diagram depicting the operation of a transmitter constructed in accordance with the invention; and FIG. 4 is a flow chart depicting the operation of a pair of liquid crystal display glasses constructed in accordance with the invention.

DETAILED DESCRIPTION OF THE PREFERRED EMBODIMENT

Reference is first made to FIG. 1 which depicts a three dimensional video display system, indicated generally as 10. Three dimensional video processing system 10 is further provided with a central processing unit 20 and a dangle or video processor 40 electrically coupled with central processing unit 20. An alternating current (AC) adapter and power provider 50 is also provided for providing power to all of the components of three dimensional video processing system 10. A transmitter 60 is electrically coupled with video processor 40. Wireless liquid crystal display (LCD) glasses 80 are selectively electrically coupleable with transmitter 60 to charge the glasses, and are selectively coupled with transmitter 60 during operation via an infra-red signal generated by transmitter 60. A video display terminal 95 is electrically coupled with video processor 40. In general, the operation of three dimensional video display system 10 as is as follows.

CPU 20 outputs a video image on output line 22, which is input to dongle/video processor 40 via an input line 42. Video processor 40 processes the video image in accordance with the invention, as will be described more fully below, and outputs a processed video signal at output line 44, which is thereafter input to video display terminal 95 via input line 92. Video display terminal 95 thereafter displays this processed video image. Video processor 40 also outputs a synchronization signal on output line 46 which is input into transmitter 60 via input line 66. This synchronization signal is synchronized with the switching from a first video image to a next video image, and between each successive video image thereafter. This synchronization signal is thereafter transmitted by infra-red control signal transmitter 64, and is received by LCD glasses 80 via an infra-red control signal receiver 84 coupled thereto. This infra-red control signal controls the operation of LCD glasses 80, and synchronizes the functioning of these glasses with the video output displayed on video display terminal 90.

As is additionally shown, AC power is supplied via a AC adapter 50, and is further supplied to transmitter 60 from power line 52 to power input line 54. From transmitter 60, power is directed via power output line 68 to video processor 40 via power input line 41. LCD glasses 80 may be charged by being coupled with transmitter 60, charge port 62 of transmitter 60 being coupled with charge port 82 of LCD glasses 80. Therefore upon proper charging, the LCD glasses work in a wireless mode, storing their own power, and receiving instructions via infra-red signal.

Reference is next made to FIG. 2 which depicts a flow chart depicting the operation of the dongle, or video processor 40. As noted above with respect to FIG. 1, a video signal is provided to video processor 40 via input line 42. This video is received by a video receiver 47, which outputs this video signal on output line 47a, and outputs horizontal and vertical syncs which are extracted from the input video signal on output line 47b. The output video on line 47a is input into a selection switch 50 via an input line 50a. A black video reference signal 51 is input to selection switch 50 via a line 50b. Selection switch 50 is further controlled via a line 50e from a video synchronization signal from a control logic module 56. Control logic module 56 receives horizontal and vertical syncs output by video receiver 47 on line 47b via an input line 56a, and further receives video data input via an input line 56b, after the video has passed from output port 47a of video receiver 47, through a video data amplifier 54. The video signal output from selection switch 50 is output on output line 50d, and is fed to a video output module 52 via a video input port 52a. Additionally, the horizontal and vertical video syncs are fed via output line 47b to an input port 52b of video output module 52. The processed video is then output on video output line 44 and is transmitted to the video display terminal 95 (FIG. 1), and a synchronization signal is output via port 56d of control logic module 56 through an output line 46, which is forwarded to transmitter 60 (FIG. 1).

In a further embodiment, a video enhancing portion 53 is further provided, which receives video input from output port 47a at an input port 48a, and receives a horizontal sync from output port 47b on an input port 48b. This module 48 outputs video which is delayed one line from the standard input video being input to selection switch 50 at input line 50a, and is input to selection switch 50 via output port 48c and through input port 50c.

During operation, in order to render an image which may be viewed in three dimensions, it is necessary to provide successive video images, each of the images being later in time, whereby an image containing every other line of video is provided to each of the viewer's eyes independently. For example, images formed of each of the even lines may be provided to the left eye, and images formed of each of the odd lines may be provided to the right eye or vice versa. Through this operation, an image which may be viewed in three dimensions is provided. In order to form the three dimensional images, video is provided to selection switch 50 via input port 50a in a continuous stream, and the horizontal and vertical syncs are provided to control logic module 56. Further, video data from video receiver 47 is provided to control logic 56 via input port 56b through video to data amplifier 54. Control logic module 56 outputs a control signal via output port 56e which is input to selection switch 50 via input control port 5e. When an image is being provided which is only to be comprised of the odd lines, the control logic provides a control switch so that the odd horizontal lines of video are output via output port 50d, and then during the time in which the even video lines would be output, selection switch 50 rather outputs the black signal from input pin 50b on output pin 50d. By continuing this operation through all the required lines on the screen, video is provided on all the odd lines, and a black or null signal is provided on each of the even lines. Upon provision of all of the odd line data to output module 52, horizontal and vertical syncs 52b clock the video signal out through output line 44 to video display terminal 90 in the proper timing sequence. Thus, an image is provided in which video is displayed only on the odd lines of the image.

Then as noted above, the next video signal must output only the even lines of video of the next image in time. Therefore, a similar operation is provided, however, whereby the even data is clocked through selection switch 50, and the video from the odd lines is replaced with a black or null video signal. Similarly, these lines are clocked in via the horizontal and vertical syncs through video output module 52. Therefore, alternating video images, which are successive in time, the first providing for example, all of the odd lines of video, and the next providing all of the even lines of video are provided to video display terminal 95.

As noted above, when providing an image which may be viewed in three dimensions, it is necessary for the left eye of the user to view every other video frame which is formed of, for example all the odd lines, and is necessary for the other, or right eye of the user, for example, to view every other video frame which is formed by, for example, data on the even lines. Therefore, a synchronization signal is provided from control logic 56 via output port 56d to transmitter 60. This synchronization signal informs the transmitter each time a new video image is to be displayed. This synchronization signal is eventually transmitted to LCD glasses 80. The signal switches the viewing of the user from the left eye to the right eye, and is coordinated to the proper images being displayed on video display terminal 95.

While this apparatus provides three dimension viewing, on very large video screens, it should be noted that a black line may be visible between each of the lines of video, since this black video has been provided on every other line, as noted above. Therefore, in an additional embodiment of the invention, as noted above, enhancement module 53 is provided. Enhancement module 53 comprises a video delay line module 48, which receives the video signal 47a at its input port 48a, and a horizontal reference 47b at its input port 48b. Video delay line module 48 delays the video the time of one line, and then outputs this video one line behind the unaltered video via output port 48c. This delayed video signal is input to selection switch 50 via input port 50c. As noted above, selection switch switches between the video input, and the video black signal to provide video on alternating lines. However, in order to improve the resolution, it is possible to switch between the active video input at pin 50a, and the one line delayed video input at line 50c. Thus, each pair of horizontal lines on the video screen will display the identical data, the first being displayed from the standard video, the second being displayed from the delayed video. Therefore, any black lines which might have been visible previously will be eliminated, since effectively in the picture, each of the lines of video will be shown in two lines, thereby providing active video on each line of the screen, while still allowing for three dimensional viewing of images. Through the use of this additional enhancement module, an improved video image may be viewed in three dimensions.

As is shown once again in FIG. 1, synchronization output signal 46 is provided to a transmitter 60. Transmitter 60 will now be more completely described making reference to FIG. 3. Transmitter 60 is provided with a power regulation module 62, an infra-red control signal generator 64, and an infrared emitting/transmitting device 66. AC power is provided to power regulator 62 via a power input port 62a. Power is output from power regulators 62 to video processor 40 via power output line 62b (FIG. 2). Power is also provided to infra-red control signal generator 64 via power input port 64b from power output port 62c and to charger 68 via power output port 62d. The power provided on output line 62d is input to charger 68 through input line 68a. Output port 68b of charger 68 is thereafter electrically coupled with three dimensional LCD glasses 80, and LCD glasses 80 are electrically charged. Power from power regulator 62 is provided via output port 62c to infra-red control signal generator via power input port 64b. This power allows the control signal generator to operate.

During operation, infra-red control signal generator 64 receives a synchronization signal 46 via input port 64a, and outputs a corresponding signal to be transmitted to LCD glasses 80 via an output port 64c. This corresponding signal is received by infra-red emitting/transmitting device 66 via input port 66a. A corresponding infra-red signal is emitted from infra-red emitting/transmitting device 66 via an infra-red output 66b. This signal is utilized by LCD glasses 80 to switch between left and right viewing eyes, as is noted above and to transmit any other information to LCD glasses 80.

Reference is next made to FIG. 4 which depicts the schematic for the operation of the LCD three dimensional glasses. As is noted in FIG. 3, during charging, the 3D glasses are coupled with charger 68 via output port 68b. Thus, charge terminal 68c of LCD glasses 80 is coupled to output port 68b of charger 68 during charging. Electricity is therefore provided to capacitor power storage 81 via input port 82. Electricity is stored here for future use. By using a capacitor, or alternatively a plurality of capacitors as an electricity storage device, it is not necessary to provide the LCD glasses with batteries. Since batteries may run out of power, and even rechargeable batteries eventually need to be replaced, the use of capacitors as a storage device improves the longevity of the product, reduces environmental waste, and provides an improved power source. Obviously, in an alternative embodiment, it would be possible to utilize conventional or rechargeable batteries to power the LCD glasses.

When necessary, power is output from capacitor power storage 81 via electrical output port 81a, and is received by power regulator 83 via electrical input port 83a. After regulation of the power, this power is output via output port 83b to an input port 85a to power all of the components of the system, which are indicated generally as 85 in FIG. 4a.

Furthermore, as is noted in FIGS. 1 and 3, a transmitted control signal 64 is transmitted by transmitter 60. Transmitting control signal 64 is received by infra-red signal detector 86 via an input line 84. Infra-red signal detector 86 outputs an electrical signal representative of the received infra-red signal via electrical output port 86a. This electrical signal is received and amplified by amplifier 87 via input port 87a, the amplified signal being output via output port 87b. This amplified electrical signal is in turn input to logic module 88 via input port 88a. Logic module 88 receives this amplified electrical signal, and upon the synchronization signal indicating the proper time, the proper signals are output via output ports 88b or 88c. A signal output on output port 88b indicates that the left eye is to view the image, and therefore shutter 89L is opened, thereby allowing light to pass therethrough. At this same time, necessarily there will be no signal output on port 88c, and therefore shutter 89R will remain closed, thereby not allowing light to pass therethrough. Upon receipt of the next portion of the synchronization signal, light transmission will be possible through shutter 89R, and shutter 89L will block all light. It is possible to operate these shutters in the opposite logic mode, whereby no signal on the input line to the shutter would indicate that the shutter should be opened and light transmitted. Therefore, when LCD glasses 80 are worn by a user, utilizing a strap 90, or other conventional retaining device, through the use of this transmitted synchronization signal, it is possible to coordinate the eye through which the user views the screen, with the information being displayed on the screen. Therefore, it is possible for the left eye only to look at, for instance, the odd lines, and the right eye to look at only the even lines, thereby allowing for a sequence of images to be viewed in three dimensions.

Therefore, by using the apparatus and method of the invention, it is possible to provide a sequence of video images which may be viewed in three dimensions having very high resolution, and which may be viewed on any type of computer, having a VGA adapter. Additionally, it is possible to vary the visual illusion of the depth of field, by defining an offset between two successive fields of video. In a preferred embodiment, the offset is initially set to plus or minus 2. It is thereafter possible to choose any value between negative 2 and 2, and in an additional embodiment, it may also be possible to chose a range between negative 5 and positive 5 in order to determine the viewed depth of field. This is useful, since depending on the size of the screen, the depth of field adjustments may render more realistic three dimensional viewing. Thus, it is possible to provide accurate three dimensional viewing for a monitor from a 14 inch, to 21 inch, and even up to a 42 inch screen or larger. This selected value is a measure of the eye spacing calibration, and therefore allows for proper viewing of three dimensional images.

As noted above, in order to implement many of the prior art three dimensional viewing devices, it is necessary to alter software, or some type of monitor mode in the computer. In accordance with the invention, however, the activation code is a visual code which is sent by software from the computer to the universal VGA adapter. Therefore, any predetermined video image may be used to activate the three dimensional capabilities of the adapter, and the video mode need not be changed during use In a preferred embodiment, the activation code comprises two black and white images, the first of which contains 63 white bars and the second of which contains 61 white bars. The first screen comprises a reset pattern, and the second an activation pattern. Specifically, the reset pattern is the screen containing the 63 white bars, which are each 256 lines in the vertical direction. They are displayed on a black screen for at least two frames and may be displayed for any number of subsequent frames. This picture resets and turns off the LCD glasses. In a preferred embodiment, these bars are horizontally scaled slightly smaller than the horizontal size of the screen and are right justified. This reset pattern may be employed to turn off the three dimensional image mode from the screen, or as a precursor to ensure a clear screen for activation of the three dimensional viewing mode.

To activate the glasses, after sending the reset pattern, the activation pattern is displayed, which comprises 61 white bars which are on 128 vertical lines, and are displayed on every second video line. This provision of the 61 white bars on every other video line tells the interface dongle which lines of video should be visible to the left eye only. Therefore, if this pattern is placed on the even lines, the even lines would be visible to the left eye and the odd lines would be visible to the right eye. If this picture were placed on the odd lines, the left eye would see only the odd lines, and the right eye would see the even lines, as noted above. It is possible to provide software which would generate this screen, as a graphical image, a bit map, or any other method for generating such a picture.

In another preferred embodiment of the present invention, there is provided means for determining a right-left image identification from one or more shutter control image lines. The video image signal may be received from a video image source signal input, then the interlaced images are formed and identified as being the left-eye or right-eye image. At least one image line per image is used for performing this identification and this identification line may contain pixels that are known to the video detector and that are easily recognizable. Further, another circuit may use the left-right image identification in order to send a shutter signal to a shutter control circuit such as the shutter glasses. Upon receiving of this signal, the shutter control circuit may open or close the left and right glasses' eye in accordance with the image currently displayed on the video monitor. The shutter control circuit may be further connected to still another circuit for finally suppressing said shutter control image lines from the video images. At this point, the identification lines are all removed from both the left-eye and the right-eye images and the interlaced images are output toward a video display in their original accurate form. In this manner, the identification lines are only used for synchronization of the displayed images with the LCD shutter glasses, but are not shown onto the video display, thus increasing the video image quality.

The product is universal, in that it supports vertical refresh rates between about 50 to 240 Hz and may be used with all major brands and types of monitors. Improved settings for each type of monitor may be provided. The transmitter works with all video cards, all monitors, and all video modes including interlaced and non-interlaced, as noted above. In addition to turning the glasses on and off, and selecting which lines are left and right eye, the initial code sent from the computer to the adapter may allow the glasses to go into a red/blue emulation mode, or a red/green emulation mode.

The glasses are guaranteed to work with any video image on a screen, and therefore any video image which may be viewed into an image which can be viewed in three dimensions. Additionally, the apparatus may run with all existing monitors and video cards, and no additional hardware of software is required. At this time, this resolution includes images up to 2048 by 3072 image, in which the left and right eyes would each view images of 2048×1536 pixels, but the operation of the invention could easily be provided to any higher resolution as required.

In a preferred embodiment, the following operating requirements ensure proper operation of the glasses. The H-sync pulse is greater than 0.6 microseconds and less than 6 microseconds. The H-sync frequency is less than 110 kHz. The maximum non-interlaced modes are as follows: 2048× 1536 ni @ 75 Hz, 1600×1200 ni @ 90 Hz, 1280×1024 ni @ 120 Hz. (Lower resolution allows higher vertical refresh rates). When an interlaced video image is viewed, the new maximum vertical capability is doubled. Preferably, there are more than 128 vertical visible lines in a video mode to activate the glasses. Additionally, video signals may be processed with bandwidths beyond 350 MHz. The capacitive load on the video is less than 1pf.

Therefore, an improved three dimensional video display apparatus is provided, which will work in any video mode, requires minimum hardware, and may be provided at minimal cost.

It will thus be seen that the objects set forth above, among those made apparent from the preceding description, are efficiently attained and, since certain changes may be made in the above composition of matter without departing from the spirit and scope of the invention, it is intended that all matter contained in the above description shall be interpreted as illustrative and not in a limiting sense.

What is claimed is:

1. A video signal processor for a 3D stereoscopic video display system in which left eye and right eye images are alternatingly displayed on a 2D video display for viewing with shutter glasses, the system comprising:

an input receiving a video image source signal comprising an interleaved left eye and right eye composite image signal in a predetermined video signal format;

a line muting circuit suppressing alternate lines of said video image source signal and outputting in said predetermined video signal format an output signal; and an output connected to said video display for supplying said output signal to said video display with alternating lines suppressed, whereby a viewer wearing stereoscopic glasses synchronized with said video display sees 3D images from said video image source.

2. The processor as claimed in claim 1, further comprising a video amplifier connected between said line muting circuit and said video display for increasing a brightness of a non-suppressed image output from said line muting circuit.

3. The processor as claimed in claim 1, wherein said line muting circuit comprises selection switch means for selecting between said video source and a source of video black alternatingly for each line of said image.

4. The processor as claimed in claim 1, wherein said line muting circuit comprises a selection switch for selecting between said video source and a video line delay means connected to said video source alternatingly for each line of said image, whereby each non-suppressed line is repeated over each suppressed line.

5. The processor as claimed in claim 1, wherein said video image source signal includes a left-right identification and activation code image, further comprising:

a code detector connected to said image source signal for determining from an image bearing portion of said source signal, an activation code indicating whether said left eye and right eye images are on odd or even lines to produce an odd-even mute signal for said line muting means, whereby said processor properly identifies right eye and left eye lines of an image of said image source signal even though a number of lines of a vertical blanking interval in said video source signal changes; and a vertical synchronization signal detector receiving said odd-even mute signal, detecting a vertical sync signal of said image source signal and generating a correct left-right shutter signal for output to a shutter control circuit with each new vertical sync signal detected.

6. The processor as claimed in claim 5, wherein said activation code is on only even or odd lines.

7. The processor as claimed in claim 6, wherein said activation code comprises a regularly repeating pattern of one of dots and dashes.

8. The processor as claimed in claim 1, further comprising:

introducer including an activation code image in said video image source;

a video mode signal generator connected to said image source for deriving from said activation code image a video mode signal indicating whether said video image source requires line muting or not; and a mode changer for changing a mode of said processor in response to said video mode signal.

9. The processor as claimed in claim 8, wherein said activation code is on only even or odd lines.

10. The processor as claimed in claim 9, wherein said activation code comprises a regularly repeating pattern of one of dots and dashes.

11. The processor as claimed in claim 1, further comprising:

a left-right image identifier connected to said image source signal for determining a left-right image identification from at least one shutter control image line contained in each image of said image source signal;

a left-right shutter signal generator for generating a correct left-right shutter signal for output to a shutter control circuit in accordance with said determined left-right image identification for each image of said image source signal;

a line suppressor connected to said image source signal for suppressing said shutter control image lines; and an output connected to said video display for supplying said video image source signal with suppressed shutter control image lines to said video display.

12. A shutter control circuit for a 3D stereoscopic video display system in which left eye and right eye images are alternatingly displayed on a 2D video display for viewing with shutter glasses, the circuit comprising:

an input receiving a video image source signal;

a left-right image identifier connected to said image source signal for determining a left-right image identification from at least one shutter control image line contained in each image of said image source signal;

a left-right shutter signal generator for generating a correct left-right shutter signal for output to a shutter control circuit in accordance with said determined left-right image identification for each image of said image source signal;

a line suppressor connected to said image source signal for suppressing said shutter control image lines; and an output connected to said video display for supplying said video image source signal with suppressed shutter control image lines to said video display, whereby said shutter control image lines do not interfere with viewing the 3D images.

13. The circuit as claimed in claim 12, wherein said left-right shutter signal generator disables said shutter control circuit when no said left-right image identification is present in said shutter control image lines.

14. The circuit as claimed in claim 12, wherein said shutter control image lines are at a top of each image of said video image source signal.

* * * * *